US011950265B2

(12) United States Patent
Lin

(10) Patent No.: US 11,950,265 B2
(45) Date of Patent: Apr. 2, 2024

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 591 days.

(21) Appl. No.: 17/162,866

(22) Filed: Jan. 29, 2021

(65) Prior Publication Data

US 2021/0153212 A1    May 20, 2021

Related U.S. Application Data

(63) Continuation of application No. PCT/CN2018/099990, filed on Aug. 10, 2018.

(51) Int. Cl.
*H04W 72/53*    (2023.01)
*H04W 72/0446*    (2023.01)
*H04W 72/23*    (2023.01)
*H04W 72/56*    (2023.01)

(52) U.S. Cl.
CPC ....... *H04W 72/53* (2023.01); *H04W 72/0446* (2013.01); *H04W 72/23* (2023.01); *H04W 72/56* (2023.01)

(58) Field of Classification Search
None
See application file for complete search history.

(56) References Cited

U.S. PATENT DOCUMENTS

| 10,736,132 B2* | 8/2020 | Davydov | H04L 5/00 |
| 2011/0070821 A1 | 3/2011 | Chun | |
| 2011/0085508 A1 | 4/2011 | Wengerter | |
| 2018/0343670 A1* | 11/2018 | Park | H04W 16/14 |
| 2019/0082448 A1* | 3/2019 | Nogami | H04L 5/0053 |
| 2019/0289621 A1 | 9/2019 | Li et al. | |

(Continued)

FOREIGN PATENT DOCUMENTS

| CN | 102325119 A | 1/2012 |
| CN | 102498678 A | 6/2012 |

(Continued)

OTHER PUBLICATIONS

International Search Report in the international application No. PCT/CN2018/099990, dated Apr. 28, 2019.

(Continued)

*Primary Examiner* — Brian S Roberts
(74) *Attorney, Agent, or Firm* — PERKINS COIE LLP

(57) ABSTRACT

A data transmission method, a terminal device, a network device are provided. The method comprises: receiving configuration information and determining, according to the configuration information, to use a first physical resource to transmit a target transport block (TB), the duration of the first physical resource is not greater than a first time domain resource length, and the first time-domain resource length is a maximum number of time-domain symbols occupied by transmission of a TB.

9 Claims, 4 Drawing Sheets

---

301

A first time-domain resource length is acquired

302

Configuration information sent by a network side is received, and it is determined according to the configuration information to use a first physical resource to transmit a target TB

(56) References Cited

U.S. PATENT DOCUMENTS

2019/0297579 A1* 9/2019 Bhattad ............... H04W 74/006
2019/0363824 A1* 11/2019 Sun ...................... H04L 5/0091

FOREIGN PATENT DOCUMENTS

| CN | 106961714 A | 7/2017 |
|---|---|---|
| CN | 108174445 A | 6/2018 |
| CN | 108270527 A | 7/2018 |
| EP | 3225070 A1 | 10/2017 |
| EP | 3541133 A1 | 9/2019 |
| WO | 2016086144 A1 | 6/2016 |
| WO | 2018103702 A1 | 6/2016 |

OTHER PUBLICATIONS

Qualcomm Incorporated, Summary of offline discussion on NR-U, Discussion and Decision, 3GPP TSG RAN WG1 #93 R1-1807777, May 21-May 25, 2018.

First Office Action of the European application No. 18929540.5, dated Feb. 24, 2022. 5 pages.
Written Opinion of the International Search Authority in the international application No. PCT/CN2018/099990, dated Apr. 28, 2019. 6 pages.
Huawei et al: "NR frame structure and scheduling on unlicensed bands", 3GPP Draft; R1-1803678, vol. RAN WG1, No. Sanya, China; Apr. 16, 2018-Apr. 20, 2018 Apr. 15, 2018 (Apr. 15, 2018), XP051425975. 8 pages.
Supplementary European Search Report in the European application No. 18929540.5, dated Jun. 2, 2021. 12 pages.
Intel Corporation, "Resource allocation and TBS", 3GPP TSG RAN WG1 Meeting #90bis R1-1717393, Prague, Czech Republic, Oct. 9-13, 2017. 13 pages.
First Office Action of the Chinese application No. 202110089680.9, dated Jul. 8, 2022. 13 pages with English translation.
Notice of Allowance of the Chinese application No. 202110089680.9, dated Sep. 28, 2022. 5 pages with English translation.
Nec, "Time domain resource allocation for mini-slot", 3GPP TSG RAN WG1 Meeting #88 R1-1701981, Athens, Greece Feb. 13-17, 2017. 3 pages.

* cited by examiner

DATA TRANSMISSION METHOD, TERMINAL DEVICE, AND NETWORK DEVICE

CROSS-REFERENCE TO RELATED APPLICATIONS

This is a continuation application of International Patent Application No. PCT/CN2018/099990, filed on Aug. 10, 2018, the disclosure of which is hereby incorporated by reference in its entirety.

BACKGROUND

In an unlicensed spectrum, a communication device (for example, a network device), before sending a signal, is required to perform Listen Before Talk (LBT) detection on a channel in the unlicensed spectrum. If LBT succeeds, the communication device may send the signal. If LBT fails, the communication device may not send the signal. Since there is uncertain when a transmitting device sends a signal, a receiving device performs blind detection during reception to determine whether the transmitting device successfully sends the signal. For ensuring fairness, during a transmission, duration of performing signal transmission by a communication device using a channel of an unlicensed spectrum may not exceed Maximum Channel Occupation Time (MCOT).

At present, a New Radio (NR) system specifies that a slot includes 14 time-domain symbols, and a Physical Downlink Shared Channel (PDSCH)/Physical Uplink Shared Channel (PUSCH) may occupy time-domain symbols in only one slot for transmission. A terminal supports at most 16 Hybrid Automatic Repeat reQuest (HARQ) processes. In an NR-Unlicensed (NR-U) system, for avoiding LBT detection as much as possible, data from a sender should be sent continuously as possible. However, when a large subcarrier spacing is adopted for transmission, as shown in FIG. 1, a subcarrier spacing of 15 kHz and 10 HARQ processes are usually adopted at present, but Channel Occupation Time (COT) may include at most 40 HARQ processes when a subcarrier spacing of 60 kHz is adopted. In such case, if Transport Block (TB) is transmitted by use of a present HARQ process, the transmission efficiency may be influenced.

SUMMARY

The disclosure relates to the technical field of information processing, and particularly to a method for data transmission, a terminal device, a network device, for solving the foregoing technical problem, so as to avoid from influencing the transmission efficiency of a system.

A first aspect provides a method for data transmission, which may be applied to a terminal device and include the following operations.

Configuration information e is received, and it is determined according to the configuration information to use a first physical resource for transmitting a target transport block (TB). Duration of the first physical resource is not greater than a first time-domain resource length, and the first time-domain resource length is a maximum number of time-domain symbols occupied by transmission of a TB.

A second aspect provides a method for data transmission, which may be applied to a network device and include the following operations.

Configuration information is sent to the terminal device, and a target transport block (TB) transmitted by the terminal device on a first physical resource is received. Duration of the first physical resource is not greater than a first time-domain resource length, and the first time-domain resource length is a maximum number of time-domain symbols occupied by transmission of a TB.

A third aspect provides a terminal device, which may include a processor, a memory configured to store a computer program capable of being run in the processor; and a transceiver configured to receive configuration information. The processor is configured to run the computer program to determine, according to the configuration information, to use a first physical resource for transmitting a target transport block (TB), wherein duration of the first physical resource is not greater than a first time-domain resource length, and the first time-domain resource length is a maximum number of time-domain symbols occupied by transmission of a TB.

DETAILED DESCRIPTION

The technical solutions in the embodiments of the disclosure are described below in combination with the drawings in the embodiments of the disclosure. Apparently, the described embodiments are only a part rather than all of the embodiments of the disclosure. All other embodiments obtained by those skilled in the art on the basis of the embodiments in the disclosure without paying creative work fall within the scope of protection of the disclosure.

The technical solutions of the embodiments of the disclosure may be applied to various communication systems such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a 5th-Generation (5G) system.

Figure 1:
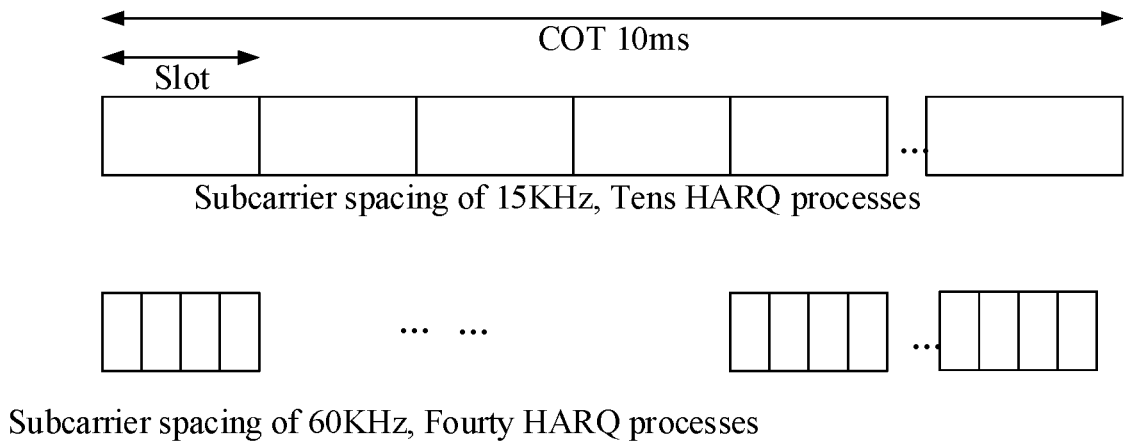
FIG. 1 is a schematic diagram of a relationship between a subcarrier spacing and transmission HARQ and COT.
Figure 2:
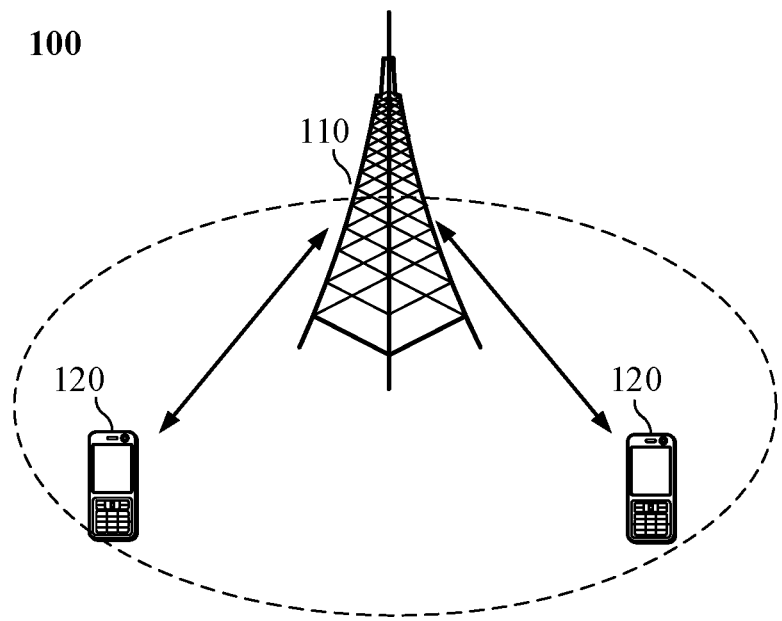
FIG. 2 is a first schematic diagram of architecture of a communication system according to an embodiment of the disclosure.

Exemplarily, a communication system 100 in the embodiments of the disclosure may be illustrated in FIG. 2 and may include a network device 110. The network device 110 may be a device communicating with a terminal device 120 (or referred to as a communication terminal or a terminal). The network device 110 may provide communication coverage for a particular geographical area and communicate with a terminal device located in the coverage. Optionally, the network device 110 may be a base station (a Base Transceiver Station (BTS)) in a GSM system or a CDMA system, a base station (a NodeB (NB)) in a WCDMA system, an evolutional base station (an Evolutional Node B (eNB or eNodeB)) in an LTE system, a wireless controller in a Cloud Radio Access Network (CRAN). Alternatively, the network device may be a mobile exchange center, a relay station, an access point, an on-board device, a wearable device, a hub, a switch, a bridge, a router, a network side device in a 5G network, a network device in a future evolutional Public Land Mobile Network (PLMN) or the like.

The communication system 100 further includes at least one terminal device 120 in the coverage of the network device 110. The terminal device used herein includes but is not limited to be connected via a wired line such as a Public Switched Telephone Network (PSTN), a Digital Subscriber Line (DSL), a digital cable, a direct cable, and/or via another data connection or network, and/or via a wireless interface such as a cellular network, a wireless local area network (WLAN), a digital television network like a Digital Video Broadcasting-Handheld (DVB-H) network, a satellite network, an Amplitude Modulation-Frequency Modulation (AM-FM) broadcasting transmitter, and/or via a device, which is configured to receive/send a communication signal, of another terminal device and/or an Internet of Things (IoT) device. The terminal device configured to communicate through the wireless interface may be referred to as "a wireless communication terminal", "a wireless terminal" or "a mobile "terminal". Examples of a mobile terminal include, but are not limited to, a satellite or cellular telephone, a personal communication system (PCS) terminal capable of combining a cellular radio telephone and data processing, faxing and data communication capabilities, a personal digital assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device having a wireless communication function, a computing device, another processing device connected to a wireless modem, an on-board device, a wearable device, a terminal device in the 5G network, a terminal device in the future evolved PLMN or the like.

Optionally, Device to Device (D2D) communication may be performed between the terminal devices 120.

Optionally, the 5G system or the 5G network may also be called a New Radio (NR) system or an NR network.

One network device and two terminals are exemplarily shown in FIG. 2. Optionally, the communication system 100 may include multiple network devices, and each of the network devices may have other number of terminals in coverage thereof, which is not limited in the embodiments of the disclosure.

Optionally, the communication system 100 may further include another network entity such as a network controller and a mobility management entity, which is not limited in the embodiments of the disclosure.

It is to be understood that a device having a communication function in the network/system in the embodiments of the disclosure may be called a communication device. Taking the communication system 100 shown in FIG. 2 as an example, the communication device may include the network device 110 and terminal 120 having the communication function, and the network device 110 and the terminal 120 may be the specific devices mentioned above and will not be elaborated herein. The communication device may further include other devices in the communication system 100, for example, other network entities like a network controller and a mobility management entity, which is not limited in the embodiments of the disclosure.

It should be understood that the terms "system" and "network" are often used interchangeably herein. The term "and/or" herein only represent an association relationship of associated objects, which means that there may be three relationships. For example, A and/or B can mean: only A exists, both A and B exist, and only B exists. In addition, the character "/" herein generally indicates that there is an "or" relationship between two associated objects.

First Embodiment

Figure 3:
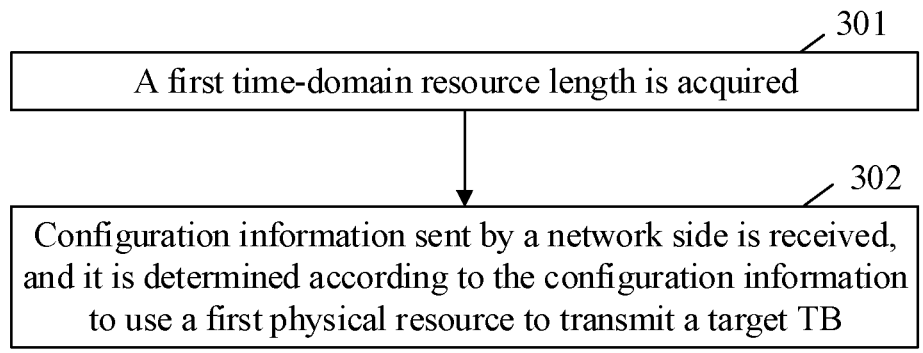
FIG. 3 is a first flowchart of a method for data transmission according to an embodiment of the disclosure.

The embodiment of the disclosure provides a method for data transmission, which is applied to a terminal device. As shown in FIG. 3, the method includes the following operations.

In 301, a first time-domain resource length is acquired. The first time-domain resource length is related to a subcarrier spacing presently adopted by the terminal device for transmitting a transport block (TB).

In 302, configuration information sent by a network side is received, and it is determined according to the configuration information to use a first physical resource to transmit a target TB. Duration of the first physical resource is not greater than the first time-domain resource length.

In the embodiment of the disclosure, the first time-domain resource length may be understood to be used to determine a maximum value of a time-domain resource used by the terminal device for transmitting a transport block (TB).

The first time-domain resource length may include representation manners as follows:
- a maximum number of Transmission Time Intervals (TTIs) occupied by transmission of the TB;
- a maximum number of slots occupied by transmission of the TB; and
- a maximum number of time-domain symbols occupied by transmission of the TB.

Specifically, the above representation manners can be implemented by preconfiguring a time-domain resource list through Radio Resource Control (RRC) signaling, that is, the list includes a maximum number of time-domain symbols.

How to acquire the first time-domain resource length is described below based on the abovementioned solution.

Two manners may be provided in the disclosure. One manner is to determine the first time-domain resource length through information sent by a network side. The other manner is to determine the first time-domain resource length by the terminal device.

Specifically, in a first manner, first information sent by the network side is received, and the first information is configured to indicate the first time-domain resource length.

Correspondingly, the terminal device may directly determine the first time-domain resource length according to a content indicated in the first information.

Furthermore, the first time-domain resource length is not greater than a first threshold. The first threshold is related to the subcarrier spacing presently used by the terminal device for transmitting the TB. That is, the first time-domain resource length is related to the first threshold, and the first threshold is related to the subcarrier spacing for transmission of the TB.

Correspondences between first thresholds and subcarrier spacing are determined by a protocol, or the first threshold is determined according to the subcarrier spacing for transmission of the TB and reference subcarrier spacing.

The correspondences between the first thresholds and the subcarrier spacing may be determined according to a preset table, for example, as shown in Table 1 or Table 2.

TABLE 1

| Subcarrier spacing | First threshold (the number of TTIs/slots) |
|---|---|
| 15 kHz | 1 |
| 30 kHz | 2 |
| 60 kHz | 4 |
| 120 kHz | 8 |

TABLE 2

| Subcarrier spacing | First threshold (the number of time-domain symbols) |
|---|---|
| 15 kHz | 14 |
| 30 kHz | 2*14 |
| 60 kHz | 4*14 |
| 120 kHz | 8*14 |

Specifically, when the first time-domain resource length is configured to characterize the maximum number of the TTIs occupied by transmission of the TB or characterize the maximum number of the slots occupied by transmission of the TB, the relationship between the first threshold and the subcarrier spacing may be determined through Table 1 described above. For example, when the subcarrier spacing is 30 KHz, the first threshold may be 2 TTIs or 2 slots. The first threshold is also determined according to Table 1 for other subcarrier spacing, which is not described repeatedly here anymore.

When the first time-domain resource length is configured to characterize the number of the time-domain symbols occupied by transmission of the TB, the relationship between the subcarrier spacing and the first threshold may be determined through Table 2 described above. For example, when the subcarrier spacing is 60 KHz, the first threshold corresponding to the subcarrier spacing may be 4*14 time-domain symbols. The first threshold (the maximum number of time-domain symbols) corresponding to other subcarrier spacing may also be determined according to Table 2, which is not described repeatedly here anymore.

The first threshold is determined according to subcarrier spacing for transmission of the TB and reference subcarrier spacing, and the reference subcarrier spacing is agreed in the protocol or configured by a base station. Besides that the first threshold is determined according to the correspondences specified in the protocol, the first threshold may also be determined according to the subcarrier spacing and the reference subcarrier space. For example, the following conditions may be included.

A result obtained by dividing the subcarrier spacing for transmission of the TB by the reference subcarrier spacing is determined as the first threshold. Specifically, the first threshold is equal to the result obtained by dividing the subcarrier spacing for transmission of the TB by the reference subcarrier spacing. For example, the reference subcarrier spacing is 15 kHz, and when subcarrier spacing of 60 kHz is used for transmission of the TB, at most 60/15=4 TTIs may be occupied by transmission of the TB.

Alternatively, the subcarrier spacing for transmission of the TB is divided by the reference subcarrier spacing, and a result obtained by dividing and a first parameter are multiplied as the first threshold. Specifically, the first threshold is equal to a result obtained by dividing the subcarrier spacing for transmission of the TB by the reference subcarrier spacing and multiplying a result obtained by dividing and the first parameter. For example, the reference subcarrier spacing is 15 kHz. When subcarrier spacing of 60 kHz is used for transmission of the TB, at most 60/15*14=56 time-domain symbols may be occupied for transmission of the TB.

The reference subcarrier spacing may be set according to a practical condition. For example, the subcarrier spacing which is set in the abovementioned example is 15 kHz, and of course, may also be set to be another value, which is not repeatedly described anymore in the embodiment.

In a second manner, the terminal device determines the first time-domain resource length.

The first time-domain resource length is determined according to the subcarrier spacing presently used by the terminal device for transmitting the TB.

Specifically, the following operation may be included. The first time-domain resource length is determined based on correspondences, preset in the protocol, between first time-domain resource lengths and subcarrier spacing presently used by the terminal device for transmitting a TB.

For example, the correspondences between the first time-domain resource lengths and the subcarrier spacing may be determined according to following Table 3 or Table 4.

TABLE 3

| Subcarrier spacing | First time-domain resource length (the number of TTIs/slots) |
|---|---|
| 15 kHz | 1 |
| 30 kHz | 2 |
| 60 kHz | 4 |
| 120 kHz | 8 |

TABLE 4

| Subcarrier spacing | First time-domain resource length (the number of time-domain symbols) |
| --- | --- |
| 15 kHz | 14 |
| 30 kHz | 2*14 |
| 60 kHz | 4*14 |
| 120 kHz | 8*14 |

Specifically, when the first time-domain resource length is configured to characterize the maximum number of the TTIs occupied by transmission of the TB or characterize the maximum number of the slots occupied by transmission of the TB, the relationship between the first time-domain resource lengths and subcarrier spacing may be determined through Table 3 described above. For example, when the subcarrier spacing is 60 KHz, the first time-domain resource length may be 4 TTIs or 4 slots. The first time-domain resource length is also determined according to Table 3 for other subcarrier spacing, which is not repeatedly described here anymore.

When the first time-domain resource length is configured to characterize the number of the time-domain symbols occupied by transmission of the TB, the relationship between the subcarrier spacing and the first time-domain resource lengths may be determined through Table 2 described above. For example, when the subcarrier spacing is 120 KHz, the first time-domain resource length corresponding to the subcarrier spacing may be 8*14 time-domain symbols. The first time-domain resource length corresponding to other subcarrier spacing may also be determined according to Table 4, which is not repeatedly described here anymore.

The first time-domain resource length is determined according to the subcarrier spacing for transmission of the TB and the reference subcarrier spacing. For example, the following conditions are included.

The result obtained by dividing the subcarrier spacing for transmission of the TB by the reference subcarrier spacing is determined as the first time-domain resource length. Specifically, the first time-domain resource length is equal to the result obtained by dividing the subcarrier spacing for transmission of the TB by the reference subcarrier spacing. For example, the reference subcarrier spacing is 15 kHz. When a subcarrier spacing of 60 kHz is used for transmission of the TB, at most 60/15=4 TTIs may be occupied for transmission of the TB.

Alternatively, the subcarrier spacing for transmission of the TB is divided by the reference subcarrier spacing, and a result obtained by dividing and the first parameter are multiplied as the first time-domain resource length. Specifically, the first time-domain resource length is equal to a result obtained by dividing the subcarrier spacing for transmission of the TB by the reference subcarrier spacing, and multiplying a result obtained by dividing and the first parameter. For example, the reference subcarrier spacing is 15 kHz. When the subcarrier spacing of 60 kHz is adopted for transmission of the TB, at most 60/15*14=56 time-domain symbols may be occupied for transmission of the TB.

The reference subcarrier spacing may be set according to the practical condition. For example, the subcarrier spacing which is set in the abovementioned example is 15 kHz, and of course, may also be set to be another value, which is not repeatedly described anymore in the embodiment.

A specific processing method in the operation 302 that the configuration information sent by the network side is received and it is determined according to the configuration information to use the first physical resource to transmit the target TB refers to the following description.

First Scenario

The first time-domain resource length is one of the maximum number of the TTIs occupied by transmission of the TB, the maximum number of the slots occupied by transmission of the TB and the maximum number of the time-domain symbols occupied by transmission of the TB.

Correspondingly, the configuration information is configured to indicate a time-domain symbol resource, used for transmission of the target TB, in a time unit or a TTI or a slot.

The first physical resource includes at least two time units, and the time unit is a TTI or a slot.

The operation that it is determined according to the configuration information to use the first physical resource to transmit the target TB may include an operation as follows. The identical time-domain symbol resources in the at least two time units are used according to the configuration information, to transmit the target TB.

Figure 4:
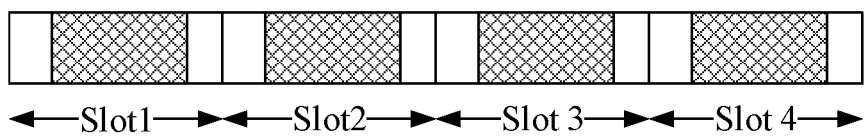
FIG. 4 is a first schematic diagram of a transmission mode according to an embodiment of the disclosure.

In the scenario, the terminal receives the configuration information sent by the base station, and the configuration information is configured to indicate a time-domain symbol for the target TB in a TTI/slot, and the terminal transmits the target TB by use of the identical time-domain symbol in multiple TTIs/slots. Referring to FIG. 4, in four slots shown in FIG. 4, time-domain symbol resources in the middle of the slots are used as time-domain symbol resources occupied by the target TB. In addition, it is to be pointed out that the multiple slots or multiple TTIs corresponding to the first physical resource in FIG. 4 are multiple continuous slots or multiple continuous TTIs. Of course, during practical processing, the multiple slots or the multiple TTIs may also be multiple discontinuous slots or TTIs.

The number of the multiple TTIs/slots is equal to the first time-domain resource length. Alternatively, the multiple TTIs or the multiple slots may be indicated by the base station, and the number is not greater than the first time-domain resource length.

Second Scenario

The first time-domain resource length is one of a maximum number of the TTIs occupied by transmission of the TB, a maximum number of the slots occupied by transmission of the TB and the maximum number of the time-domain symbols by transmission of the TB.

The first physical resource includes at least two time units, and the time unit is a TTI or a slot.

It is determined according to the configuration information to use continuous time-domain symbol resources in the at least two time units to transmit the target TB, the continuous time-domain symbol resources are at least a part of time-domain symbols in all time-domain symbol resources in the at least two time units.

The configuration information is configured to indicate a starting time-domain symbol position in the first time unit in the at least two time units and an ending time-domain symbol position in the last time unit in the at least two time units for transmission of the target TB.

It can be understood that the starting time-domain symbol position in the first time unit may be a first time-domain symbol in the first time unit, and of course, may also be an Nth time-domain symbol in the first time unit. N is greater than 1 and less than the number of all time-domain symbols in the first time unit. Similarly, the ending time-domain symbol position in the last time unit may be a last time-domain symbol in the last time unit and may also be an Mth time-domain symbol in the last time unit. M is more than or equal to 1 and less than or equal to the number of all time-domain symbols in the last time unit.

Specifically, the starting time-domain symbol position in the first time unit in the at least two time units and the ending time-domain symbol position in the last time unit in the at least two time units for transmission of the target TB may be indicated in the following manners.

In a first manner, the configuration information indicates a starting symbol position (relative to within a slot) and an ending symbol position (relative to within a slot), and a starting symbol and an ending symbol are in a first slot and a last slot respectively. For example, if the starting symbol is a symbol 2 and the ending symbol is a symbol 10, it is indicated that transmission is started from the symbol 2 in the first slot and is ended at the symbol 10 in the last slot.

In a second manner, the configuration information indicates the starting symbol position (relative to within a slot) and a duration (relative to within a slot), and the ending symbol position (relative to within a slot) is obtained according to the duration. The starting symbol and the ending symbol are in the first slot and the last slot respectively. For example, if the starting symbol is the symbol 2 and the duration is 8, it is determined that the ending symbol is the symbol 10, and it is indicated that transmission is started from the symbol 2 in the first slot and is ended at the symbol 10 in the last slot. In this manner, an existing Downlink Control Information (DCI) indication method, i.e., a method only supporting scheduling in a slot, may be reused, thereby implementing scheduling of multiple slots.

In a third manner, a starting symbol position for transmission of the target TB is indicated, or a starting symbol position and an ending symbol position (relative to multiple slots) for transmission of the target TB are indicated, or a starting symbol position and a duration (including multiple slots) for transmission of the target TB are indicated.

In this manner, one of multiple pieces of information is indicated through the configuration information. For example, if the starting symbol in the first time unit is 3, it can be understood that transmission of the TB is started from the starting symbol until the TB is completely transmitted. Alternatively, if it is set in the configuration information that the starting symbol is the symbol 2 and the duration is 28 symbols (a slot includes 14 symbols), transmission of the TB is started from the starting symbol 2 and transmission is stopped at a second time symbol in a third time unit. Alternatively, it is indicated in the configuration information that the starting symbol is the symbol 2 and the ending symbol is a symbol 10 in a second slot after a starting slot.

Figure 5:
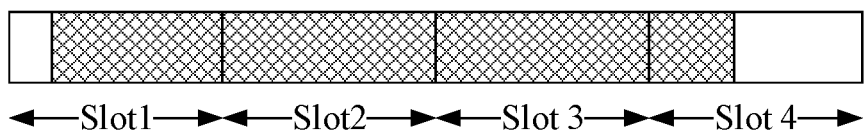
FIG. 5 is a second schematic diagram of a transmission mode according to an embodiment of the disclosure.

The above example may refer to FIG. 5. The configuration information is configured to indicate a starting symbol position in the first TTI/slot in multiple TTIs/slots and an ending symbol position in the last TTI/slot for the target TB, and all (available) symbols in the middle TTIs/slots are configured to transmit the target TB. The available symbol represents a time-domain symbol that is not occupied by another high-priority channel/signal. The number of the multiple TTIs/slots is equal to the first time-domain resource length, or is indicated by the base station, and is not to be greater than the first time-domain resource length. As shown in FIG. 5, the first time-domain resource length occupies continuous time-domain symbol resources in multiple continuous slots (or TTIs).

Furthermore, the first physical resource in the scenario may be all time-domain symbols between the starting symbol position and the ending symbol position, or all available time-domain symbols between the starting symbol position and the ending symbol position. The available time-domain symbol is a time-domain symbol that is not occupied by a high-priority signal or channel.

That is, the first physical resource may be all the time-domain symbols determined above, and of course, may also be a part of time-domain symbols. When the first physical resource includes a part of time-domain symbols in all the time-domain symbols determined above, time-domain symbols that have been occupied by other high-priority signals or channels are removed, and the remaining symbols are used for transmission of the target TB.

The method further includes an operation that a Transport Block Size (TBS) corresponding to the target TB is determined according to the total number of time-domain symbols in the first physical resource. That is, the transport block size corresponding to one transmission of the target TB is determined according to the total number of the time-domain symbols. For example, present time-domain symbols may include 30 time-domain symbols, and then the corresponding TBS is a size of the 30 time-domain symbols.

It can be seen that, with the above technical solution, the first physical resource for transmission of the target TB may be determined according to the first time-domain resource length related to subcarrier spacing for a TB, and the target TB is transmitted. In such a manner, a physical resource corresponding to transmission of the TB may be flexibly regulated according to the subcarrier spacing, so that the transmission efficiency of a system is ensured.

Second Embodiment

Figure 6:
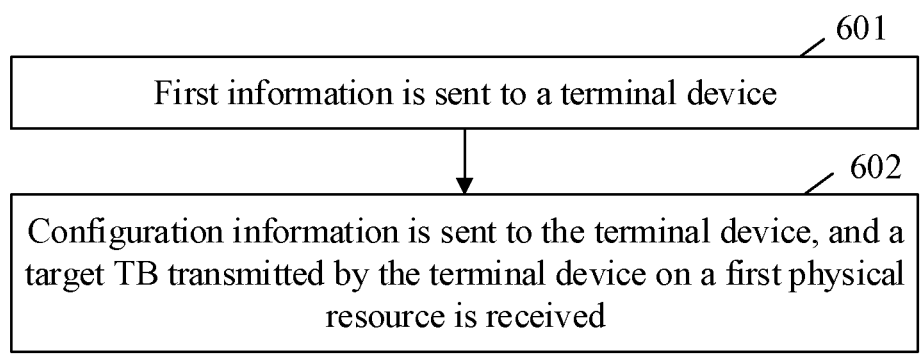
FIG. 6 is a second flowchart of a method for data transmission according to an embodiment of the disclosure.

The embodiment of the disclosure provides a method for data transmission, which is applied to a network device. As shown in FIG. 6, the method includes the following operations.

In 601, first information is sent to a terminal device. The first information is configured to indicate a first time-domain resource length. The first time-domain resource length is related to a subcarrier spacing presently used by the terminal device for transmitting a TB, and the first time-domain resource length may be used to determine a maximum value of a time-domain resource used by the terminal device for transmitting a transport block (TB).

In 602, configuration information is sent to the terminal device, and a target TB transmitted by the terminal device on a first physical resource is received. Duration of the first physical resource is not greater than the first time-domain resource length.

In the embodiment of the disclosure, the first time-domain resource length may be understood to be used to determine a maximum value of a time-domain resource used by the terminal device for transmitting a transport block (TB).

The first time-domain resource length may include representation manners as follows:
a maximum number of TTIs occupied by transmission of a TB;
a maximum number of slots occupied by transmission of a TB; and
a maximum number of time-domain symbols occupied by transmission of a TB.

Specifically, the above representation manners can be implemented by preconfiguring a time-domain resource list through Radio Resource Control (RRC) signaling, that is, the list includes a maximum number of time-domain symbols.

How to acquire the first time-domain resource length is described below based on the abovementioned solution.

Two manners may be provided in the disclosure. One manner is to determine the first time-domain resource length through information sent by a network side. The other manner is to determine the first time-domain resource length by the terminal device.

The manner that the network side sends the first information to the terminal to determine the first time-domain resource length is described in the embodiment.

The first time-domain resource length is not greater than a first threshold. The first threshold is related to the subcarrier spacing presently used by the terminal device for transmitting the TB. That is, the first time-domain resource length is related to the first threshold, and the first threshold is related to the subcarrier spacing for transmission of the TB.

Correspondences between the first thresholds and subcarrier spacing are determined by a protocol, or the first threshold is determined according to the subcarrier spacing for transmission of the TB and reference subcarrier spacing.

The correspondences between the first thresholds and the subcarrier spacing may be determined according to a preset table, for example, as shown in Table 1 or Table 2.

TABLE 1

| Subcarrier Spacing | First Threshold (the number of TTIs/slots) |
| --- | --- |
| 15 kHz | 1 |
| 30 kHz | 2 |
| 60 kHz | 4 |
| 120 kHz | 8 |

TABLE 2

| Subcarrier spacing | First threshold (the number of time-domain symbols) |
| --- | --- |
| 15 kHz | 14 |
| 30 kHz | 2*14 |
| 60 kHz | 4*14 |
| 120 kHz | 8*14 |

Specifically, when the first time-domain resource length is configured to characterize the maximum number of the TTIs occupied by transmission of the TB or characterize the maximum number of the slots occupied by transmission of the TB, the relationship between the first threshold and the subcarrier spacing may be determined through Table 1 described above. For example, when the subcarrier spacing is 30 KHz, the first threshold may be 2 TTIs or 2 slots. The first threshold is also determined according to Table 1 for other subcarrier spacing, which is not described repeatedly here anymore.

When the first time-domain resource length is configured to characterize the number of the time-domain symbols occupied by transmission of the TB, the relationship between the subcarrier spacing and the first threshold may be determined through Table 2 described above. For example, when the subcarrier spacing is 60 KHz, the first threshold corresponding to the subcarrier spacing may be 4*14 time-domain symbols. The first threshold (the maximum number of time-domain symbols) corresponding to other subcarrier spacing may also be determined according to Table 2, which is not described repeatedly here anymore.

The first threshold is determined according to subcarrier spacing for transmission of the TB and reference subcarrier spacing, and the reference subcarrier spacing is agreed in the protocol or configured by a base station. Besides that the first threshold is determined according to the correspondences specified in the protocol, the first threshold may also be determined according to the subcarrier spacing and the reference subcarrier space. For example, the following conditions may be included.

A result obtained by dividing the subcarrier spacing for transmission of the TB by the reference subcarrier spacing is determined as the first threshold. Specifically, the first threshold is equal to the result obtained by dividing the subcarrier spacing for transmission of the TB by the reference subcarrier spacing. For example, the reference subcarrier spacing is 15 kHz, and when subcarrier spacing of 60 kHz is used for transmission of the TB, at most 60/15=4 TTIs may be occupied by transmission of the TB.

Alternatively, the subcarrier spacing for transmission of the TB is divided by the reference subcarrier spacing, and a result obtained by dividing and a first parameter are multiplied as the first threshold. Specifically, the first threshold is equal to a result obtained by dividing the subcarrier spacing for transmission of the TB by the reference subcarrier spacing and multiplying a result obtained by dividing and the first parameter. For example, the reference subcarrier spacing is 15 kHz. When subcarrier spacing of 60 kHz is used for transmission of the TB, at most 60/15*14=56 time-domain symbols may be occupied for transmission of the TB.

The reference subcarrier spacing may be set according to a practical condition. For example, the subcarrier spacing which is set in the abovementioned example is 15 kHz, and of course, may also be set to be another value, which is not repeatedly described anymore in the embodiment.

A specific processing method for the operation that the configuration information is determined and the terminal device is instructed based on the configuration information to use the first physical resource for transmitting the target TB refers to the following description.

First Scenario

The configuration information is configured to indicate a time-domain symbol resource for transmission of the target TB in a time unit or a TTI or a slot.

The first physical resource includes at least two time units, and the time unit is a TTI or a slot.

The operation that it is determined according to the configuration information to use the first physical resource to transmit the target TB may include an operation as follows. The identical time-domain symbol resources in the at least two time units are used according to the configuration information to transmit the target TB.

In the scenario, the terminal receives the configuration information sent by the base station, and the configuration information is configured to indicate a time-domain symbol for the target TB in a TTI/slot, and the terminal transmits the target TB by use of the identical time-domain symbols in multiple TTIs/slots. Referring to FIG. 4, in four slots shown in FIG. 4, time-domain symbol resources in the middle of the slots are used as time-domain symbol resources occupied by the target TB. In addition, it is to be pointed out that the multiple slots or multiple TTIs corresponding to the first physical resource in FIG. 4 are multiple continuous slots or multiple continuous TTIs. Of course, during practical processing, the multiple slots or the multiple TTIs may also be multiple discontinuous slots or TTIs.

The number of the multiple TTIs/slots is equal to the first time-domain resource length. Alternatively, the multiple TTIs or the multiple slots may be indicated by the base station, and the number is not greater than the first time-domain resource length.

Second Scenario

The first time-domain resource length is one of a maximum number of the TTIs occupied by transmission of the TB, a maximum number of the slots occupied by transmission of the TB and the maximum number of the time-domain symbols by transmission of the TB.

The first physical resource includes at least two time units, and the time unit is a TTI or a slot.

The configuration information is configured to indicate a starting time-domain symbol position in the first time unit in the at least two time units and an ending time-domain symbol position in the last time unit in the at least two time units for transmission of the target TB.

It can be understood that the starting time-domain symbol position in the first time unit may be a first time-domain symbol in the first time unit, and of course, may also be an Nth time-domain symbol in the first time unit. N is greater than 1 and less than the number of all time-domain symbols in the first time unit. Similarly, the ending time-domain symbol position in the last time unit may be a last time-domain symbol in the last time unit and may also be an Mth time-domain symbol in the last time unit. M is more than or equal to 1 and less than or equal to the number of all time-domain symbols in the last time unit.

Specifically, the starting time-domain symbol position in the first time unit in the at least two time units and the ending time-domain symbol position in the last time unit in the at least two time units for transmission of the target TB may be indicated in the following manners.

In a first manner, the configuration information indicates a starting symbol position (relative to within a slot) and an ending symbol position (relative to within a slot), and a starting symbol and an ending symbol are in a first slot and a last slot respectively. For example, if the starting symbol is a symbol 2 and the ending symbol is a symbol 10, it is indicated that transmission is started from the symbol 2 in the first slot and is ended at the symbol 10 in the last slot.

In a second manner, the configuration information indicates the starting symbol position (relative to within a slot) and a duration (relative to within a slot), and the ending symbol position (relative to within a slot) is obtained according to the duration. The starting symbol and the ending symbol are in the first slot and the last slot respectively. For example, if the starting symbol is the symbol 2 and the duration is 8, it is determined that the ending symbol is the symbol 10, and it is indicated that transmission is started from the symbol 2 in the first slot and is ended at the symbol 10 in the last slot. In this manner, an existing Downlink Control Information (DCI) indication method, i.e., a method only supporting scheduling in a slot, may be reused, thereby implementing scheduling of multiple slots.

In a third manner, a starting symbol position for transmission of the target TB is indicated, or a starting symbol position and an ending symbol position (relative to multiple slots) for transmission of the target TB are indicated, or a starting symbol position and a duration (including multiple slots) for transmission of the target TB are indicated.

In this manner, one of multiple pieces of information is indicated through the configuration information. For example, if the starting symbol in the first time unit is 3, it can be understood that transmission of the TB is started from the starting symbol until the TB is completely transmitted. Alternatively, if it is set in the configuration information that the starting symbol is the symbol 2 and the duration is 28 symbols (a slot includes 14 symbols), transmission of the TB is started from the starting symbol 2 and transmission is stopped at a second time symbol in a third time unit. Alternatively, it is indicated in the configuration information that the starting symbol is the symbol 2 and the ending symbol is a symbol 10 in a second slot after a starting slot.

The above example may refer to FIG. 5. The configuration information is configured to indicate a starting symbol position of the target TB in the first TTI/slot in multiple TTIs/slots and an ending symbol position of the target TB in the last TTI/slot, and all (available) symbols in the middle TTIs/slots are configured to transmit the target TB. The available symbol represents a time-domain symbol that is not occupied by another high-priority channel/signal. The number of the multiple TTIs/slots is equal to the first time-domain resource length, or is indicated by the base station, and is not to be greater than the first time-domain resource length. As shown in FIG. 5, the first time-domain resource length occupies continuous time-domain symbol resources in multiple continuous slots (or TTIs).

Furthermore, the first physical resource in the scenario may be all time-domain symbols between the starting symbol position and the ending symbol position, or all available time-domain symbols between the starting symbol position and the ending symbol position. The available time-domain symbol is a time-domain symbol that is not occupied by a high-priority signal or channel.

That is, the first physical resource may be all the time-domain symbols determined above, and of course, may also be a part of time-domain symbols. When the first physical resource includes a part of time-domain symbols in all the time-domain symbols determined above, time-domain symbols that have been occupied by other high-priority signals or channels are removed, and the remaining symbols are used for transmission of the target TB.

The method further includes an operation that a Transport Block Size (TBS) corresponding to the target TB is determined according to the total number of time-domain symbols in the first physical resource. That is, the transport block size corresponding to one transmission of the target TB is determined according to the total number of the time-domain symbols. For example, present time-domain symbols may include 30 time-domain symbols, and then the corresponding TBS is a size of the 30 time-domain symbols.

It can be seen that, with the above technical solution, the first physical resource for transmission of the target TB may be determined according to the first time-domain resource length related to subcarrier spacing for a TB, and the target TB is transmitted. In such a manner, a physical resource corresponding to transmission of the TB may be flexibly regulated according to the subcarrier spacing, so that the transmission efficiency of a system is ensured.

Third Embodiment

Figure 7:
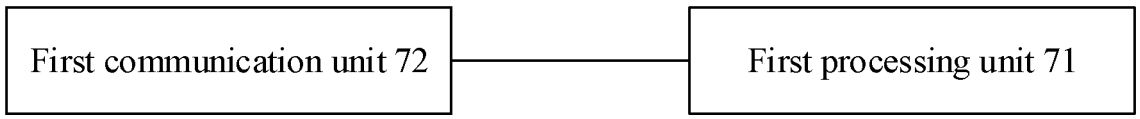
FIG. 7 is a composition structure diagram of a terminal device according to an embodiment of the disclosure.

The embodiment of the disclosure provides a terminal device, which, as shown in FIG. 7, includes a first processing unit 71 and a first communication unit 72.

The first processing unit 71 is configured to acquire a first time-domain resource length. The first time-domain resource length is related to a subcarrier spacing presently used by the terminal device for transmitting a transport block (TB).

The first communication unit 72 is configured to receive configuration information sent by a network side, and determine, according to the configuration information, to use a first physical resource for transmitting a target TB. Duration of the first physical resource is not greater than the first time-domain resource length.

In the embodiment of the disclosure, the first time-domain resource length may be understood to be used to determine a maximum value of a time-domain resource used by the terminal device for transmitting a TB.

The first time-domain resource length may include representation manners as follows:

- a maximum number of TTIs occupied by transmission of a TB;
- a maximum number of slots occupied by transmission of the TB; and
- a maximum number of time-domain symbols occupied by transmission of the TB.

Specifically, the above representation manners can be implemented by preconfiguring a time-domain resource list through Radio Resource Control (RRC) signaling, that is, the list includes a maximum number of time-domain symbols.

How to acquire the first time-domain resource length is described below based on the abovementioned solution.

Two manners may be provided in the disclosure. One manner is to determine the first time-domain resource length through information sent by a network side. The other manner is to determine the first time-domain resource length by the terminal device.

In a first manner, first information sent by the network side is received, and the first information is configured to indicate the first time-domain resource length.

Specifically, in a first manner, the first processing unit 71 is configured to receive, through the first communication unit 72, first information sent by the network side. The first information is configured to indicate the first time-domain resource length.

Correspondingly, the first time-domain resource length may be directly determined according to a content indicated in the first information.

Furthermore, the first time-domain resource length is not greater than a first threshold. The first threshold is related to the subcarrier spacing presently used by the terminal device for transmitting the TB. That is, the first time-domain resource length is related to the first threshold, and the first threshold is related to the subcarrier spacing for transmission of the TB.

Correspondences between the first thresholds and subcarrier spacing are determined by a protocol, or the first threshold is determined according to the subcarrier spacing for transmission of the TB and reference subcarrier spacing.

The correspondences between the first thresholds and the subcarrier spacing may be determined according to a preset table, for example, as shown in Table 1 or Table 2.

TABLE 1

| Subcarrier spacing | First threshold (the number of TTIs/slots) |
|---|---|
| 15 kHz | 1 |
| 30 kHz | 2 |
| 60 kHz | 4 |
| 120 kHz | 8 |

TABLE 2

| Subcarrier spacing | First threshold (the number of time-domain symbols) |
|---|---|
| 15 kHz | 14 |
| 30 kHz | 2*14 |
| 60 kHz | 4*14 |
| 120 kHz | 8*14 |

Specifically, when the first time-domain resource length is configured to characterize the maximum number of the TTIs occupied by transmission of the TB or characterize the maximum number of the slots occupied by transmission of the TB, the relationship between the first threshold and the subcarrier spacing may be determined through Table 1 described above. For example, when the subcarrier spacing is 30 KHz, the first threshold may be 2 TTIs or 2 slots. The first threshold is also determined according to Table 1 for other subcarrier spacing, which is not described repeatedly here anymore.

When the first time-domain resource length is configured to characterize the number of the time-domain symbols occupied by transmission of the TB, the relationship between the subcarrier spacing and the first threshold may be determined through Table 2 described above. For example, when the subcarrier spacing is 60 KHz, the first threshold corresponding to the subcarrier spacing may be 4*14 time-domain symbols. The first threshold (the maximum number of time-domain symbols) corresponding to other subcarrier spacing may also be determined according to Table 2, which is not described repeatedly here anymore.

The first threshold is determined according to subcarrier spacing for transmission of the TB and reference subcarrier spacing, and the reference subcarrier spacing is agreed in the protocol or configured by a base station. Besides that the first threshold is determined according to the correspondences specified in the protocol, the first threshold may also be determined according to the subcarrier spacing and the reference subcarrier space. For example, the following conditions may be included.

The first processing unit 71 is configured to determine a result obtained by dividing the subcarrier spacing for transmission of the TB by the reference subcarrier spacing as the first threshold. Specifically, the first threshold is equal to the result obtained by dividing the subcarrier spacing for transmission of the TB by the reference subcarrier spacing. For example, the reference subcarrier spacing is 15 kHz, and when subcarrier spacing of 60 kHz is used for transmission of the TB, at most 60/15=4 TTIs may be occupied by transmission of the TB Alternatively, the first processing unit 71 is configured to divide the subcarrier spacing for transmission of the TB by the reference subcarrier spacing, and multiply a result obtained by dividing and a first parameter as the first threshold. Specifically, the first threshold is equal to a result obtained by dividing the subcarrier spacing for transmission of the TB by the reference subcarrier spacing and multiplying a result obtained by dividing and the first parameter. For example, the reference subcarrier spacing is 15 kHz. When subcarrier spacing of 60 kHz is used for transmission of the TB, at most 60/15*14=56 time-domain symbols may be occupied for transmission of the TB.

The reference subcarrier spacing may be set according to a practical condition. For example, the subcarrier spacing which is set in the abovementioned example is 15 kHz, and of course, may also be set to be another value, which is not repeatedly described anymore in the embodiment.

In a second manner, the terminal device determines the first time-domain resource length.

The first processing unit 71 is configured to determine the first time-domain resource length according to the subcarrier spacing presently used by the terminal device for transmitting the TB.

Specifically, the first time-domain resource length is determined based on correspondences, preset in the protocol, between first time-domain resource lengths and subcarrier spacing presently used by the terminal device for transmitting a TB.

For example, the correspondences between the first time-domain resource lengths and the subcarrier spacing may be determined according to following Table 3 or Table 4.

TABLE 3

| Subcarrier spacing | First time-domain resource length (the number of TTIs/slots) |
|---|---|
| 15 kHz | 1 |
| 30 kHz | 2 |
| 60 kHz | 4 |
| 120 kHz | 8 |

TABLE 4

| Subcarrier spacing | First time-domain resource length (the number of time-domain symbols) |
|---|---|
| 15 kHz | 14 |
| 30 kHz | 2*14 |
| 60 kHz | 4*14 |
| 120 kHz | 8*14 |

Specifically, when the first time-domain resource length is configured to characterize the maximum number of the TTIs occupied by transmission of the TB or characterize the maximum number of the slots occupied by transmission of the TB, the relationship between the first time-domain resource lengths and subcarrier spacing may be determined through Table 3 described above. For example, when the subcarrier spacing is 60 KHz, the first time-domain resource length may be 4 TTIs or 4 slots. The first time-domain resource length is also determined according to Table 3 for other subcarrier spacing, which is not repeatedly described here anymore.

When the first time-domain resource length is configured to characterize the number of the time-domain symbols occupied by transmission of the TB, the relationship between the subcarrier spacing and the first time-domain resource lengths may be determined through Table 2 described above. For example, when the subcarrier spacing is 120 KHz, the first time-domain resource length corresponding to the subcarrier spacing may be 8*14 time-domain symbols. The first time-domain resource length (the maximum number of time-domain symbols) corresponding to other subcarrier spacing may also be determined according to Table 4, which is not repeatedly described here anymore.

The first time-domain resource length is determined according to the subcarrier spacing for transmission of the TB and the reference subcarrier spacing. For example, the following conditions are included.

The first processing unit 71 is configured to determine the result obtained by dividing the subcarrier spacing for transmission of the TB by the reference subcarrier spacing as the first time-domain resource length. Specifically, the first time-domain resource length is equal to the result obtained by dividing the subcarrier spacing for transmission of the TB by the reference subcarrier spacing. For example, the reference subcarrier spacing is 15 kHz. When a subcarrier spacing of 60 kHz is used for transmission of the TB, at most 60/15=4 TTIs may be occupied for transmission of the TB.

Alternatively, the first processing unit 71 is configured to divide the subcarrier spacing for transmission of the TB by the reference subcarrier spacing, and multiply a result obtained by dividing and the first parameter as the first time-domain resource length. Specifically, the first time-domain resource length is equal to a result obtained by dividing the subcarrier spacing for transmission of the TB by the reference subcarrier spacing, and multiplying a result obtained by dividing and the first parameter. For example, the reference subcarrier spacing is 15 kHz. When the subcarrier spacing of 60 kHz is adopted for transmission of the TB, at most 60/15*14=56 time-domain symbols may be occupied for transmission of the TB.

The reference subcarrier spacing may be set according to the practical condition. For example, the subcarrier spacing which is set in the abovementioned example is 15 kHz, and of course, may also be set to be another value, which is not repeatedly described anymore in the embodiment.

A specific processing method that the configuration information sent by the network side is received and it is determined according to the configuration information to use the first physical resource to transmit the target TB refers to the following description.

First Scenario

The first time-domain resource length is one of the maximum number of the TTIs occupied by transmission of the TB, the maximum number of the slots occupied by transmission of the TB and the maximum number of the time-domain symbols occupied by transmission of the TB.

Correspondingly, the configuration information is configured to indicate a time-domain symbol resource, used for transmission of the target TB, in a time unit or a TTI or a slot.

The first physical resource includes at least two time units, and the time unit is a TTI or a slot.

The first processing unit 71 is configured to use, according to the configuration information, identical time-domain symbol resources in the at least two time units for transmitting the target TB.

In the scenario, the terminal receives the configuration information sent by the base station, and the configuration information is configured to indicate a time-domain symbol for the target TB in a TTI/slot, and the terminal transmits the target TB using the identical time-domain symbols in multiple TTIs/slots. Referring to FIG. 4, in four slots shown in FIG. 4, a time-domain symbol resource in the middle of the slot is used as the time-domain symbol resource occupied by the target TB. In addition, it is to be pointed out that the multiple slots or multiple TTIs corresponding to the first physical resource in FIG. 4 are multiple continuous slots or multiple continuous TTIs. Of course, during practical processing, the multiple slots or the multiple TTIs may also be multiple discontinuous slots or TTIs.

The number of the multiple TTIs/slots is equal to the first time-domain resource length. Alternatively, the multiple TTIs or the multiple slots may be indicated by the base station, and the number is not greater than the first time-domain resource length.

Second Scenario

The first time-domain resource length is one of a maximum number of the TTIs occupied by transmission of the TB, a maximum number of the slots occupied by transmission of the TB and the maximum number of the time-domain symbols by transmission of the TB.

The first physical resource includes at least two time units, and the time unit is a TTI or a slot.

The first processing unit 71 is configured to determine, according to the configuration information, to use continuous time-domain symbol resources in the at least two time units to transmit the target TB. The continuous time-domain symbol resources are at least a part of time-domain symbols in all time-domain symbol resources in the at least two time units.

The configuration information is configured to indicate a starting time-domain symbol position in the first time unit in the at least two time units and an ending time-domain symbol position in the last time unit in the at least two time units for transmission of the target TB.

It can be understood that the starting time-domain symbol position in the first time unit may be a first time-domain symbol in the first time unit, and of course, may also be an Nth time-domain symbol in the first time unit. N is greater than 1 and less than the number of all time-domain symbols in the first time unit. Similarly, the ending time-domain symbol position in the last time unit may be a last time-domain symbol in the last time unit and may also be an Mth time-domain symbol in the last time unit. M is more than or equal to 1 and less than or equal to the number of all time-domain symbols in the last time unit.

Specifically, the starting time-domain symbol position in the first time unit in the at least two time units and the ending time-domain symbol position in the last time unit in the at least two time units for transmission of the target TB may be indicated in the following manners.

In a first manner, the configuration information indicates a starting symbol position (relative to within a slot) and an ending symbol position (relative to within a slot), and a starting symbol and an ending symbol are in a first slot and a last slot respectively. For example, if the starting symbol is a symbol 2 and the ending symbol is a symbol 10, it is indicated that transmission is started from the symbol 2 in the first slot and is ended at the symbol 10 in the last slot.

In a second manner, the configuration information indicates the starting symbol position (relative to within a slot) and a duration (relative to within a slot), and the ending symbol position (relative to within a slot) is obtained according to the duration. The starting symbol and the ending symbol are in the first slot and the last slot respectively. For example, if the starting symbol is the symbol 2 and the duration is 8, it is determined that the ending symbol is the symbol 10, and it is indicated that transmission is started from the symbol 2 in the first slot and is ended at the symbol 10 in the last slot. In this manner, an existing Downlink Control Information (DCI) indication method, i.e., a method only supporting scheduling in a slot, may be reused, thereby implementing scheduling of multiple slots In a third manner, a starting symbol position for transmission of the target TB is indicated, or a starting symbol position and an ending symbol position (relative to multiple slots) for transmission of the target TB are indicated, or a starting symbol position and a duration (including multiple slots) for transmission of the target TB are indicated.

In this manner, one of multiple pieces of information is indicated through the configuration information. For example, if the starting symbol in the first time unit is 3, it can be understood that transmission of the TB is started from the starting symbol until the TB is completely transmitted. Alternatively, if it is set in the configuration information that the starting symbol is the symbol 2 and the duration is 28 symbols (a slot includes 14 symbols), transmission of the TB is started from the starting symbol 2 and transmission is stopped at a second time symbol in a third time unit. Alternatively, it is indicated in the configuration information that the starting symbol is the symbol 2 and the ending symbol is a symbol 10 in a second slot after a starting slot.

The above example may refer to FIG. 5. The configuration information is configured to indicate a starting symbol position of the target TB in the first TTI/slot in multiple TTIs/slots and an ending symbol position of the target TB in the last TTI/slot, and all (available) symbols in middle TTIs/slots are configured to transmit the target TB. The available symbol represents a time-domain symbol that is not occupied by another high-priority channel/signal. The number of the multiple TTIs/slots is equal to the first time-domain resource length, or is indicated by the base station, and is not to be greater than the first time-domain resource length. As shown in FIG. 5, the first time-domain resource length occupies continuous time-domain symbol resources in multiple continuous slots (or TTIs).

Furthermore, the first physical resource in the scenario may be all time-domain symbols between the starting symbol position and the ending symbol position, or all available time-domain symbols between the starting symbol position and the ending symbol position. The available time-domain symbol is a time-domain symbol that is not occupied by a high-priority signal or channel.

That is, the first physical resource may be all the time-domain symbols determined above, and of course, may also be a part of time-domain symbols. When the first physical resource includes a part of time-domain symbols in all the time-domain symbols determined above, time-domain symbols that have been occupied by other high-priority signals or channels are removed, and the remaining symbols are used for transmission of the target TB.

The first processing unit 71 is configured to determine a Transport Block Size (TBS) corresponding to the target TB according to the total number of time-domain symbols in the first physical resource. That is, the transport block size corresponding to one transmission of the target TB is determined according to the total number of the time-domain symbols. For example, present time-domain symbols may include 30 time-domain symbols, and then the corresponding TBS is a size of the 30 time-domain symbols.

It can be seen that, with the above technical solution, the first physical resource for transmission of the target TB may be determined according to the first time-domain resource length related to subcarrier spacing for a TB, and the target TB is transmitted. In such a manner, a physical resource corresponding to transmission of the TB may be flexibly regulated according to the subcarrier spacing, so that the transmission efficiency of a system is ensured.

Fourth Embodiment

Figure 8:
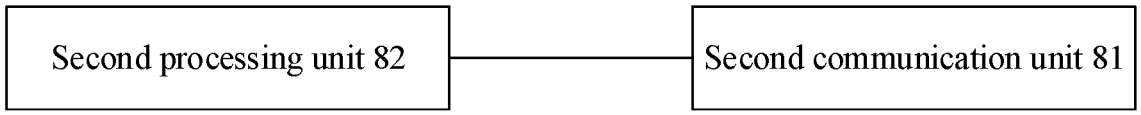
FIG. 8 is a composition structure diagram of a network device according to an embodiment of the disclosure.

The embodiment of the disclosure provides a network device, which, as shown in FIG. 8, includes a second communication unit 81.

The second communication unit 81 is configured to send first information to a terminal device. The first information is configured to indicate a first time-domain resource length. The first time-domain resource length is related to a subcarrier spacing presently used by the terminal device for transmitting a TB, and the first time-domain resource length may be used to determine a maximum value of a time-domain resource used by the terminal device for transmitting a transport block (TB). The second communication unit is configured to send configuration information to the terminal device and receive a target TB transmitted by the terminal device on a first physical resource. Duration of the first physical resource is not greater than the first time-domain resource length.

In the embodiment of the disclosure, the first time-domain resource length may be understood to be used to determine a maximum value of a time-domain resource used by the terminal device for transmitting a transport block (TB).

The first time-domain resource length may include representation manners as follows:

a maximum number of TTIs occupied by transmission of a TB;

a maximum number of slots occupied by transmission of the TB; and a maximum number of time-domain symbols occupied by transmission of the TB.

Specifically, the above representation manners can be implemented by preconfiguring a time-domain resource list through RRC signaling, that is, the list includes a maximum number of time-domain symbols.

How to acquire the first time-domain resource length is described below based on the abovementioned solution.

Two manners may be provided in the disclosure. One manner is to determine the first time-domain resource length through information sent by a network side. The other manner is to determine the first time-domain resource length by the terminal device.

The manner that the network side sends the first information to the terminal to determine the first time-domain resource length is described in the embodiment.

The first time-domain resource length is not greater than a first threshold. The first threshold is related to the subcarrier spacing presently used by the terminal device for transmitting the TB. That is, the first time-domain resource length is related to the first threshold, and the first threshold is related to the subcarrier spacing for transmission of the TB.

Correspondences between the first thresholds and subcarrier spacing are determined by a protocol, or the first threshold is determined according to the subcarrier spacing for transmission of the TB and reference subcarrier spacing.

The correspondences between the first thresholds and the subcarrier spacing may be determined according to a preset table, for example, as shown in Table 1 or Table 2.

TABLE 1

| Subcarrier spacing | First threshold (the number of TTIs/slots) |
| --- | --- |
| 15 kHz | 1 |
| 30 kHz | 2 |
| 60 kHz | 4 |
| 120 kHz | 8 |

TABLE 2

| Subcarrier spacing | First threshold (the number of time-domain symbols) |
| --- | --- |
| 15 kHz | 14 |
| 30 kHz | 2*14 |
| 60 kHz | 4*14 |
| 120 kHz | 8*14 |

Specifically, when the first time-domain resource length is configured to characterize the maximum number of the TTIs occupied by transmission of the TB or characterize the maximum number of the slots occupied by transmission of the TB, the relationship between the first threshold and the subcarrier spacing may be determined through Table 1 described above. For example, when the subcarrier spacing is 30 KHz, the first threshold may be 2 TTIs or 2 slots. The first threshold is also determined according to Table 1 for other subcarrier spacing, which is not described repeatedly here anymore.

When the first time-domain resource length is configured to characterize the number of the time-domain symbols occupied by transmission of the TB, the relationship between the subcarrier spacing and the first threshold may be determined through Table 2 described above. For example, when the subcarrier spacing is 60 KHz, the first threshold corresponding to the subcarrier spacing may be 4*14 time-domain symbols. The first threshold (the maximum number of time-domain symbols) corresponding to other subcarrier spacing may also be determined according to Table 2, which is not described repeatedly here anymore.

The first threshold is determined according to subcarrier spacing for transmission of the TB and reference subcarrier spacing, and the reference subcarrier spacing is agreed in the protocol or configured by a base station. Besides that the first threshold is determined according to the correspondences specified in the protocol, the first threshold may also be determined according to the subcarrier spacing and the reference subcarrier space. For example, the following conditions may be included.

The second processing unit 82 is configured to determine a result obtained by dividing the subcarrier spacing for transmission of the TB by the reference subcarrier spacing as the first threshold. Specifically, the first threshold is equal to the result obtained by dividing the subcarrier spacing for transmission of the TB by the reference subcarrier spacing. For example, the reference subcarrier spacing is 15 kHz, and when subcarrier spacing of 60 kHz is used for transmission of the TB, at most 60/15=4 TTIs may be occupied by transmission of the TB Alternatively, the second processing unit 82 is configured to divide the subcarrier spacing for transmission of the TB by the reference subcarrier spacing, and multiply a result obtained by dividing and a first parameter as the first threshold. Specifically, the first threshold is equal to a result obtained by dividing the subcarrier spacing for transmission of the TB by the reference subcarrier spacing and multiplying a result obtained by dividing and the first parameter. For example, the reference subcarrier spacing is 15 kHz. When subcarrier spacing of 60 kHz is used for transmission of the TB, at most 60/15*14=56 time-domain symbols may be occupied for transmission of the TB.

The reference subcarrier spacing may be set according to a practical condition. For example, the subcarrier spacing which is set in the abovementioned example is 15 kHz, and of course, may also be set to be another value, which is not repeatedly described anymore in the embodiment.

A specific processing method for the operation that the configuration information is determined and the terminal device is instructed based on the configuration information to use the first physical resource for transmitting the target TB refers to the following description.

First Scenario

The configuration information is configured to indicate a time-domain symbol resource for transmission of the target TB in a time unit or a TTI or a slot.

The first physical resource includes at least two time units, and the time unit is a TTI or a slot.

The operation that it is determined according to the configuration information to use the first physical resource to transmit the target TB may include an operation as follows. The identical time-domain symbol resources in the at least two time units are used according to the configuration information to transmit the target TB.

In the scenario, the configuration information is configured to indicate a time-domain symbol for the target TB in a TTI/slot, and the terminal transmits the target TB by use of the identical time-domain symbols in multiple TTIs/slots. Referring to FIG. 4, in four slots shown in FIG. 4, time-domain symbol resources in the middle of the slots are used as time-domain symbol resources occupied by the target TB. In addition, it is to be pointed out that the multiple slots or multiple TTIs corresponding to the first physical resource in FIG. 4 are multiple continuous slots or multiple continuous TTIs. Of course, during practical processing, the multiple slots or the multiple TTIs may also be multiple discontinuous slots or TTIs.

The number of the multiple TTIs/slots is equal to the first time-domain resource length. Alternatively, the multiple TTIs or the multiple slots may be indicated by the base station, and the number is not greater than the first time-domain resource length.

Second Scenario

The first time-domain resource length is one of a maximum number of the TTIs occupied by transmission of the TB, a maximum number of the slots occupied by transmission of the TB and the maximum number of the time-domain symbols by transmission of the TB.

The first physical resource includes at least two time units, and the time unit is a TTI or a slot.

The configuration information is configured to indicate a starting time-domain symbol position in the first time unit in the at least two time units and an ending time-domain symbol position in the last time unit in the at least two time units for transmission of the target TB.

It can be understood that the starting time-domain symbol position in the first time unit may be a first time-domain symbol in the first time unit, and of course, may also be an Nth time-domain symbol in the first time unit. N is greater than 1 and less than the number of all time-domain symbols in the first time unit. Similarly, the ending time-domain symbol position in the last time unit may be a last time-domain symbol in the last time unit and may also be an Mth time-domain symbol in the last time unit. M is more than or equal to 1 and less than or equal to the number of all time-domain symbols in the last time unit.

Specifically, the starting time-domain symbol position in the first time unit in the at least two time units and the ending time-domain symbol position in the last time unit in the at least two time units for transmission of the target TB may be indicated in the following manners.

In a first manner, the configuration information indicates a starting symbol position (relative to within a slot) and an ending symbol position (relative to within a slot), and a starting symbol and an ending symbol are in a first slot and a last slot respectively. For example, if the starting symbol is a symbol 2 and the ending symbol is a symbol 10, it is indicated that transmission is started from the symbol 2 in the first slot and is ended at the symbol 10 in the last slot.

In a second manner, the configuration information indicates the starting symbol position (relative to within a slot) and a duration (relative to within a slot), and the ending symbol position (relative to within a slot) is obtained according to the duration. The starting symbol and the ending symbol are in the first slot and the last slot respectively. For example, if the starting symbol is the symbol 2 and the duration is 8, it is determined that the ending symbol is the symbol 10, and it is indicated that transmission is started from the symbol 2 in the first slot and is ended at the symbol 10 in the last slot. In this manner, an existing Downlink Control Information (DCI) indication method, i.e., a method only supporting scheduling in a slot, may be reused, thereby implementing scheduling of multiple slots.

In a third manner, a starting symbol position for transmission of the target TB is indicated, or a starting symbol position and an ending symbol position (relative to multiple slots) for transmission of the target TB are indicated, or a starting symbol position and a duration (including multiple slots) for transmission of the target TB are indicated.

In this manner, one of multiple pieces of information is indicated through the configuration information. For example, if the starting symbol in the first time unit is 3, it can be understood that transmission of the TB is started from the starting symbol until the TB is completely transmitted. Alternatively, if it is set in the configuration information that the starting symbol is the symbol 2 and the duration is 28 symbols (a slot includes 14 symbols), transmission of the TB is started from the starting symbol 2 and transmission is stopped at a second time symbol in a third time unit. Alternatively, it is indicated in the configuration information that the starting symbol is the symbol 2 and the ending symbol is a symbol 10 in a second slot after a starting slot.

The above example may refer to FIG. 5. The configuration information is configured to indicate a starting symbol position of the target TB in the first TTI/slot in multiple TTIs/slots and an ending symbol position of the target TB in the last TTI/slot, and all (available) symbols in the middle TTIs/slots are configured to transmit the target TB. The available symbol represents a time-domain symbol that is not occupied by another high-priority channel/signal. The number of the multiple TTIs/slots is equal to the first time-domain resource length, or is indicated by the base station, and is not to be greater than the first time-domain resource length. As shown in FIG. 5, the first time-domain resource length occupies continuous time-domain symbol resources in multiple continuous slots (or TTIs).

Furthermore, the first physical resource in the scenario may be all time-domain symbols between the starting symbol position and the ending symbol position, or all available time-domain symbols between the starting symbol position and the ending symbol position. The available time-domain symbol is a time-domain symbol that is not occupied by a high-priority signal or channel.

That is, the first physical resource may be all the time-domain symbols determined above, and of course, may also be a part of time-domain symbols. When the first physical resource includes a part of time-domain symbols in all the time-domain symbols determined above, time-domain symbols that have been occupied by other high-priority signals or channels are removed, and the remaining symbols are used for transmission of the target TB.

The second processing unit 82 is configured to determine a Transport Block Size (TBS) corresponding to the target TB according to the total number of time-domain symbols in the first physical resource. That is, the transport block size corresponding to one transmission of the target TB is determined according to the total number of the time-domain symbols. For example, present time-domain symbols may include 30 time-domain symbols, and then the corresponding TBS is a size of the 30 time-domain symbols.

It can be seen that, with the above technical solution, the first physical resource for transmission of the target TB may be determined according to the first time-domain resource length related to subcarrier spacing for a TB, and the target TB is transmitted. In such a manner, a physical resource corresponding to transmission of the TB may be flexibly regulated according to the subcarrier spacing, so that the transmission efficiency of a system is ensured.

Figure 9:
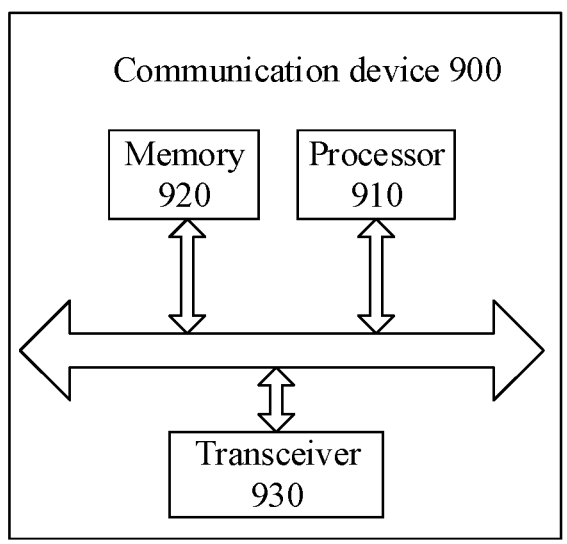
FIG. 9 is a composition structure diagram of a communication device according to an embodiment of the disclosure.

FIG. 9 is a schematic structure diagram of a communication device 900 according to an embodiment of the disclosure. The communication device 900 shown in FIG. 9 includes a processor 910, and the processor 910 may call and run a computer program in a memory to implement the method in the embodiments of the disclosure.

Optionally, as shown in FIG. 9, the communication device 900 may further include the memory 920. The processor 910 may call and run the computer program in the memory 920 to implement the method in the embodiments of the disclosure.

The memory 920 may be a separate device independent of the processor 910 and may also be integrated into the processor 910.

Optionally, as shown in FIG. 9, the communication device 900 may further include a transceiver 930, and the processor 910 may control the transceiver 930 to communicate with another device, specifically sending information or data to the another device or receiving information or data sent by the other device.

The transceiver 930 may include a transmitter and a receiver. The transceiver 930 may further include an antenna, and the number of the antennas may be one or more.

Optionally, the communication device 900 may specifically be a network device of the embodiment of the disclosure, and the communication device 900 may implement corresponding flows implemented by the network device in each method of the embodiments of the disclosure. For simplicity, elaborations are omitted herein.

Optionally, the communication device 900 may specifically be a terminal device or network device of the embodiment of the disclosure, and the communication device 900 may implement corresponding flows implemented by the mobile terminal/terminal device in each method of the embodiments of the disclosure. For simplicity, elaborations are omitted herein.

Figure 10:
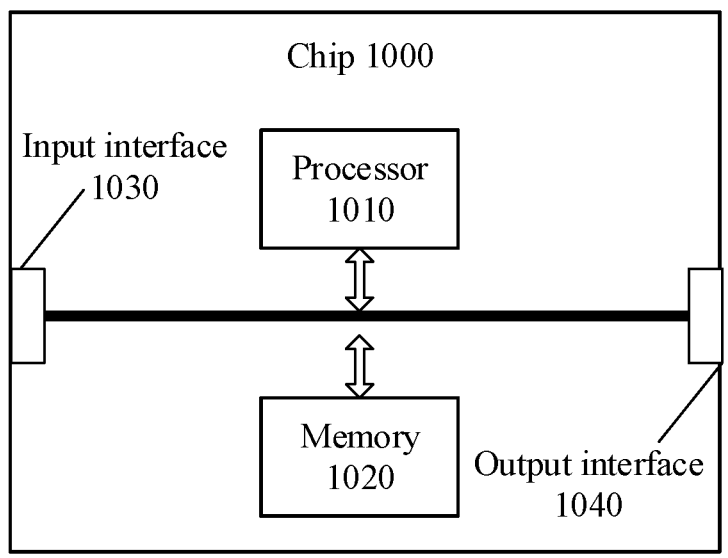
FIG. 10 is a schematic block diagram of a chip according to an embodiment of the disclosure.

FIG. 10 is a schematic structure diagram of a chip according to another embodiment of the disclosure. The chip 1000 shown in FIG. 10 includes a processor 1010, and the processor 1010 may call and run a computer program in a memory 1020 to implement the method in the embodiments of the disclosure.

Optionally, as shown in FIG. 10, the chip 1000 may further include the memory 1020. The processor 1010 may call and run the computer program in the memory 1020 to implement the method in the embodiments of the disclosure.

The memory 1020 may be a separate device independent of the processor 1010 and may also be integrated into the processor 1010.

Optionally, the chip 1000 may further include an input interface 1030. The processor 1010 may control the input interface 1030 to communicate with another device or chip, specifically acquiring information or data sent by the other device or chip.

Optionally, the chip 1000 may further include an output interface 1040. The processor 1010 may control the output interface 1040 to communicate with another device or chip, specifically outputting information or data sent by the other device or chip.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the terminal device of the embodiments of the disclosure, and the chip may implement corresponding flows implemented by the terminal device in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

Figure 11:
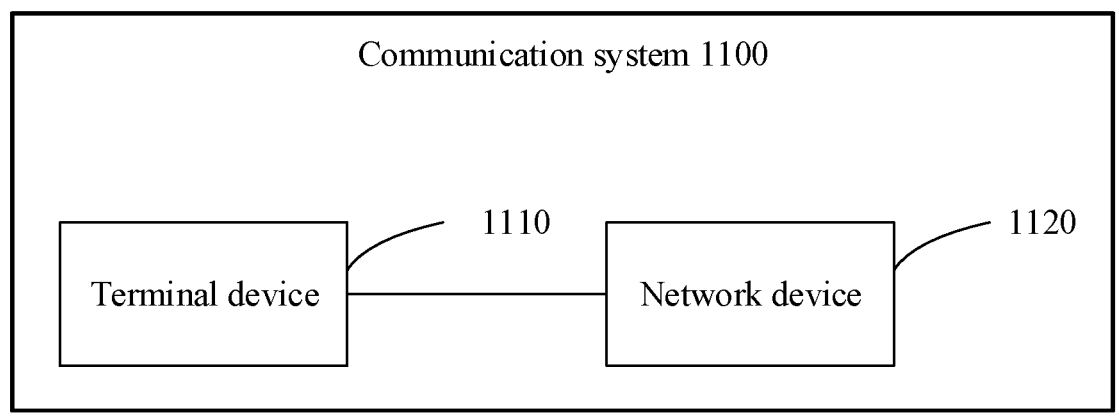
FIG. 11 is a second schematic diagram of architecture of a communication system according to an embodiment of the disclosure.

FIG. 11 is a schematic block diagram of a communication system 1100 according to an embodiment of the disclosure. As shown in FIG. 11, a communication system 1100 includes a terminal device 1110 and a network device 1120.

The terminal device 1110 may be configured to realize corresponding functions implemented by the terminal device in the method, and the network device 1120 may be configured to implement corresponding functions realized by the network device in the method. For simplicity, elaborations are omitted herein.

It is to be understood that the processor in the embodiment of the disclosure may be an integrated circuit chip and has a signal processing capability. In an implementation process, each step of the above method embodiments may be implemented by an integrated logical circuit of hardware in the processor or an instruction in a software form. The above processor may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and implements the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but to be not limited to, memories of these and any other proper types.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a terminal device in the embodiments of the disclosure, and the computer program enables a computer to execute corresponding flows implemented by a mobile terminal/the terminal device in each method of the embodiments of the disclosure. For simplicity, elaborations are omitted herein.

The embodiments of the disclosure further provide a computer program product, which includes a computer program instruction.

Optionally, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to a mobile terminal/terminal device in the embodiments of the disclosure, and the computer program instruction enables the computer to execute corresponding flows implemented by the mobile terminal/terminal device in each method of the embodiments of the disclosure. For simplicity, elaborations are omitted herein.

The embodiments of the disclosure further provide a computer program.

Optionally, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

Optionally, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that regarding specific operation processes of the system, device and unit described above, reference may be made to the corresponding processes in the above method embodiment, and elaborations are omitted herein for convenient and brief description.

In some embodiments provided by the disclosure, it is to be understood that the disclosed system, device and method may be implemented in another manner. For example, the device embodiment described above is only schematic. For example, division of the units is only logic function division, and other division manners may be adopted during practical implementation. For example, multiple units or components may be combined or integrated into another system, or some characteristics may be neglected or not executed. In addition, displayed or discussed coupling or direct coupling or communication connection may be indirect coupling or communication connection implemented through some interfaces, the device or the units, and may be electrical and mechanical or in other forms.

The units described as separate parts may or may not be physically separated, and parts displayed as units may or may not be physical units, and namely may be located in the same place, or may also be distributed to multiple network units. A part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being implemented in form of software functional unit and sold or used as an independent product, the function may also be stored in a computer-readable storage medium. Based on such an understanding, an essential part of the technical solutions in the disclosure, a part of the technical solutions making contributions to the prior art, or a part of the technical solutions may be embodied in a form of a software product. The computer software product is stored in a storage medium and includes several instructions configured to enable a computer device (which may be a personal computer, a server, a network device or the like) to execute all or a part of the operations of the method in each embodiment of the disclosure. The above-mentioned storage medium includes: various media capable of storing program codes such as a U disk, a mobile hard disk, a Read-Only Memory (ROM), a Random Access Memory (RAM), a magnetic disk and an optical disk.

The foregoing is only the specific embodiments of the disclosure, and the scope of protection of the disclosure is not limited thereto. Any variations or replacements easily appreciated by those skilled in the art within the technical scope disclosed by the disclosure shall fall within the scope of protection of the disclosure. Therefore, the scope of protection of the disclosure shall conform to the scope of protection of the claims.

The invention claimed is:

1. A method for data transmission, applied to a terminal device and comprising:
   receiving configuration information; and
   determining, according to the configuration information, to use a first physical resource for transmitting a target transport block (TB), wherein duration of the first physical resource is not greater than a first time-domain resource length, and the first time-domain resource length is a maximum number of time-domain symbols occupied by transmission of a TB;
   wherein the configuration information is configured to indicate a starting time-domain symbol position in a first time unit in at least two time units and an ending time-domain symbol position in a last time unit in the at least two time units for transmission of the target TB; or the configuration information is configured to indicate the starting time-domain symbol position in the first time unit in the at least two time units and the duration of the first physical resource for transmission of the target TB; and
   wherein the first physical resource comprises:
   all available time-domain symbols between the starting time-domain symbol position and the ending time-domain symbol position, wherein the available time-domain symbols are time-domain symbols that are not occupied by a signal or channel having a higher priority than the target TB.

2. The method of claim 1, further comprising:
   determining an ending time-domain symbol position of the first physical resource in the at least two time units based on the starting time-domain symbol position, the duration and a number of time-domain symbols in a time unit.

3. The method of claim 1, wherein the at least two time units are at least two slots.

4. A method for data transmission, applied to a network device and comprising:
   sending configuration information to the terminal device; and
   receiving a target transport block (TB) transmitted by the terminal device on a first physical resource, wherein duration of the first physical resource is not greater than a first time-domain resource length, and the first time-domain resource length is a maximum number of time-domain symbols occupied by transmission of a TB;
   wherein the configuration information is configured to indicate a starting time-domain symbol position in a first time unit in at least two time units and an ending time-domain symbol position in a last time unit in the at least two time units for transmission of the target TB; or the configuration information is configured to indicate the starting time-domain symbol position in the first time unit in the at least two time units and the duration of the first physical resource for transmission of the target TB; and
   wherein the first physical resource comprises:
   all available time-domain symbols between the starting time-domain symbol position and the ending time-domain symbol position, wherein the available time-domain symbols are time-domain symbols that are not occupied by a signal or channel having a higher priority than the target TB.

5. The method of claim 4, wherein an ending time-domain symbol position of the first physical resource in the at least two time units is determined based on the starting time-domain symbol position, the duration and a number of time-domain symbols in a time unit.

6. The method of claim 4, wherein the at least two time units are at least two slots.

7. A terminal device, comprising:
   a processor;
   a memory configured to store a computer program capable of being run in the processor; and
   a transceiver configured to receive configuration information,
   wherein the processor is configured to run the computer program to determine, according to the configuration information, to use a first physical resource for transmitting a target transport block (TB), wherein duration of the first physical resource is not greater than a first time-domain resource length, and the first time-domain resource length is a maximum number of time-domain symbols occupied by transmission of a TB;
   wherein the configuration information is configured to indicate a starting time-domain symbol position in a first time unit in at least two time units and an ending time-domain symbol position in a last time unit in the at least two time units for transmission of the target TB; or the configuration information is configured to indicate the starting time-domain symbol position in the first time unit in the at least two time units and the duration of the first physical resource for transmission of the target TB; and
   wherein the first physical resource comprises:
   all available time-domain symbols between the starting time-domain symbol position and the ending time-domain symbol position, wherein the available time-domain symbols are time-domain symbols that are not occupied by a signal or channel having a higher priority than the target TB.

8. The terminal device of claim 7, wherein
   the processor is configured to run the computer program to determine an ending time-domain symbol position of the first physical resource in the at least two time units based on the starting time-domain symbol position, the duration and a number of time-domain symbols in a time unit.

9. The terminal device of claim 7, wherein the at least two time units are at least two slots.

* * * * *